United States Patent [19]

Nishimura et al.

[11] 4,219,841
[45] Aug. 26, 1980

[54] WHITE BALANCE CONTROL CIRCUIT

[75] Inventors: Toshimichi Nishimura, Sagamihara; Seisuke Yamanaka, Mitaka; Masaru Shimada, Yokohama, all of Japan

[73] Assignee: Sony Corporation, Tokyo, Japan

[21] Appl. No.: 17,551

[22] Filed: Mar. 5, 1979

[30] Foreign Application Priority Data

Mar. 7, 1978 [JP] Japan .................................. 53-25643

[51] Int. Cl.² ............................................. H04N 9/535
[52] U.S. Cl. .................................................... 358/29
[58] Field of Search ......................................... 358/29

[56] References Cited

U.S. PATENT DOCUMENTS

Re. 28,774 4/1976 Kubota .................................... 358/29

Primary Examiner—Robert L. Richardson
Attorney, Agent, or Firm—Hill, Van Santen, Steadman, Chiara & Simpson

[57] ABSTRACT

A white balance control circuit for an encoded composite color television signal is disclosed in which three primary color signals of green (G), blue (B) and red (R) are matrixed to be mixed color signal components, color difference signals of R-G and B-G are provided from the mixed color signal components, and gain control circuits provided on the signal transmission paths of two primary color signals of R and B are so controlled in their gains that the color difference signals become zero, when the white balance adjustment is done.

5 Claims, 6 Drawing Figures

WHITE BALANCE CONTROL CIRCUIT

BACKGROUND OF THE INVENTION

1. Field of the Invention

The present invention relates generally to a white balance control circuit, and is directed more particularly to a white balance control system suitable for use in a color image pick-up apparatus.

2. Description of the Prior Art

A prior art white balance control circuit will be described with reference to FIG. 1, in which three CCD's (charge coupled device) are used as imaging elements or imagers for developing primary color signals or red, green and blue primary color signals R, G and B. In this case, three CCDs 1R, 1G and 1B are arranged in the horizontal direction with a shift of ½x (x being the arranging pitch of picture elements in the horizontal direction) between adjacent CCDs successively, as shown in FIG. 2. That is, an image pick-up device formed of three CCDs 1R, 1G and 1B arranged above is used to pick up an object (not shown) through red, green and blue color filters, respectively.

FIG. 3 is the graph which shows the relation between the response of the three primary color signals R, G and B and the phase thereof. In the graph of FIG. 3, the solid line represents the fundamental band component, the one-dot-chain line represents the side band component, and $\tau_H$ designates the sampling period of each picture element and corresponds to the time in which the horizontal scanning moves across the arranging pitch or distance x between adjacent picture elements.

Turning back to FIG. 1, picked up outputs R, G and B from the imager elements 1R, 1G and 1B are applied through sampling hold circuits 2R, 2G, 2B and pre-amplifiers 3R, 3G and 3B to process-amplifiers 4R, 4G, 4B, respectively, and the outputs therefrom are fed to an encoder 10 as may be well known.

In the encoder 10, a matrix circuit 12 is supplied with the outputs from the pre-amplifiers 4R, 4G, 4B and then produces a luminance signal Y and color difference signals R-Y and B-Y. The luminance signal Y therefrom is applied through a low pass filter 14Y to a composite or adding circuit 15, while the color difference signals R-Y and B-Y are applied through low pass filters 14R and 14B, which pass therethrough the frequency band components up to about 1.0 MHz, respectively, and clamp circuits 16R and 16B, which serve to reproduce DC components, respectively, to modulators 17R and 17B, respectively. The modulated output signals therefrom or carrier chrominance signals are applied to the adding circuit 15 to be added to the luminance signal Y. Thus, the adding circuit 15 produces a composite color television signal and delivers the same to an output terminal 15a. Reference numeral 20 designates a white balance control circuit which generally controls the red and blue primary color signals R and B based upon the green primary color signal G as the reference to achieve the white balance control. To this end, gain control circuits 21R and 21B are provided in the signal transmission paths of the red and blue primary color signals R and B, respectively.

The respective primary color signals R, G and B, which are fed to the process-amplifiers 4R, 4G and 4B, are also fed to a pair of subtracting circuits 22R and 22B in the white balance control circuit 20 from which primary color difference signals R-G and B-G are delivered. The primary color difference signals R-G and B-G are fed through low pass filters 23R and 23B, which act to remove undesirable side band components, to clamp circuits 24R and 24B for reproducing DC components. The clamped outputs therefrom are respectively fed to level comparing circuits 25R and 25B to be level-compared with a reference level from a reference potential source E whose potential is selected as the clamp level in this example.

The compared outputs from the comparing circuits 25R and 25B are respectively fed to detecting circuits 26R and 26B to be detected and the detected outputs therefrom are respectively fed through integrating circuits 27R and 27B to memory circuits 28R and 28B whose outputs are applied to the gain control circuits 21R and 21B as their gain control signals, respectively.

In FIG. 1, SWR and SWB designate switches which are connected between the integrating circuits 27R, 27B and the memory circuits 28R, 28B and used upon controlling or adjusting the white balance, respectively.

When the white balance is controlled or adjusted, if a white board is picked up and the switches SWR and SWB are made ON, the gain control circuits 21R and 21B are so controlled automatically that the levels of the primary color signals R and B become the same as the level of the primary color signal G which is the reference. After the white balance is controlled or adjusted, the switches SWR and SWB are made OFF. After the white balance is thus controlled or adjusted, the gain control is carried out by the outputs from the memory circuits 28R and 28B.

In the case that an image pickup tube such as a vidicon tube is used in place of a semiconductor element, for example, a CCD as the imaging elements 1R, 1G and 1B, the low pass filters 23R and 23B, which are provided for removing the undesirable side band components in the example of FIG. 1, become unnecessary.

As described above, according to the prior art white balance control circuit, the white balance is controlled or adjusted in accordance with the respective primary color signals R, G and B which are fed to the process-amplifiers 4R, 4G and 4B. When the white balance is perfect, the carrier chrominance signals must be balanced. In fact, however, there may occur such a phenomenon that R≠G and B≠G appear in the carrier chrominance signals by the influence of the signal transmission system from the process-amplifiers 4R, 4G and 4B to the modulators 17R and 17B. For example, due to the scattering of the circuit elements or secular changes thereof, the balance is disturbed.

Therefore, it is difficult in the above prior art that the white balance is controlled or adjusted perfectly and also the white balance control circuit 20 itself of the prior art becomes complicated in the circuit construction.

OBJECTS AND SUMMARY OF THE INVENTION

Accordingly, an object of the present invention is to provide a novel white balance control circuit free from the drawback inherent to the prior art.

Another object of the invention is to provide a white balance control circuit which can control or adjust the white balance correctly.

A further object of the invention is to provide a white balance control circuit which is simple in circuit construction but can control or adjust the white balance correctly.

According to an aspect of the present invention, there is provided a white balance control system for an encoded composite color television signal which comprises a circuit for generating three primary color signals of green, blue and red, a matrix circuit for converting the three primary color signals into a luminance signal and two mixed color signals, a circuit for deriving two primary color difference signals out of the two mixed color signals, a level detecting circuit for detecting the levels of the respective primary color difference signals, a feedback gain control circuit for controlling the levels of two of the three primary color signals supplied to the matrix circuit in response to the detected outputs of the level detecting circuit, modulating circuits for modulating subcarriers with the mixed color signals for generating a chrominance signal, and a mixing circuit for mixing the luminance signal and chrominance signal for generating an encoded composite color television signal.

The other objects, features and advantages of the present invention will become apparent from the following description taken in conjunction with the accompanying drawings through which the like references designate the same elements.

DESCRIPTION OF THE PREFERRED EMBODIMENTS

According to the present invention, the color difference signals R-G and B-G are provided from the color signal components which are obtained after the primary color signals R, G and B are matrixed, and the white balance is controlled or adjusted so as to make the above color difference signals zero.

An example of the white balance control system according to the present invention will be described with reference to FIG. 4 in which the invention is applied to the case where CCDs are employed as the imaging elements 1R, 1G and 1B, respectively, the same as in the prior art example shown in FIG. 1.

Figure 6:
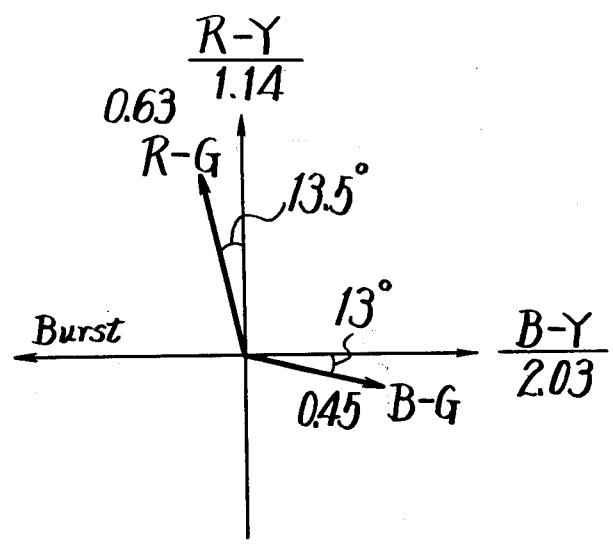
FIG. 6 is a graph showing the modulating axes in the NTSC system.
Figure 3:
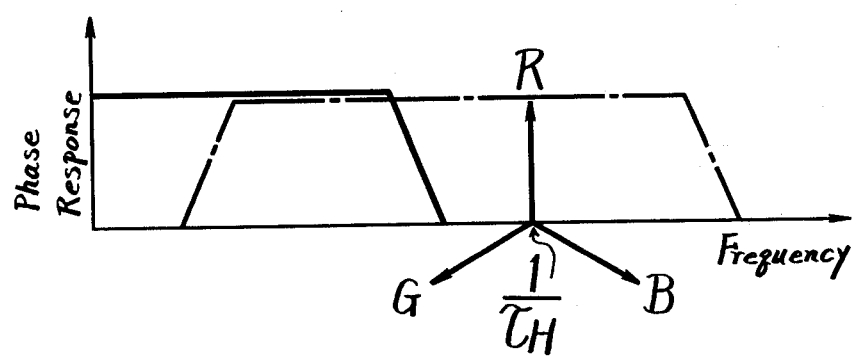
FIG. 3 is a graph showing the spectra of the picked-up outputs and the carrier phases.
Figure 4:
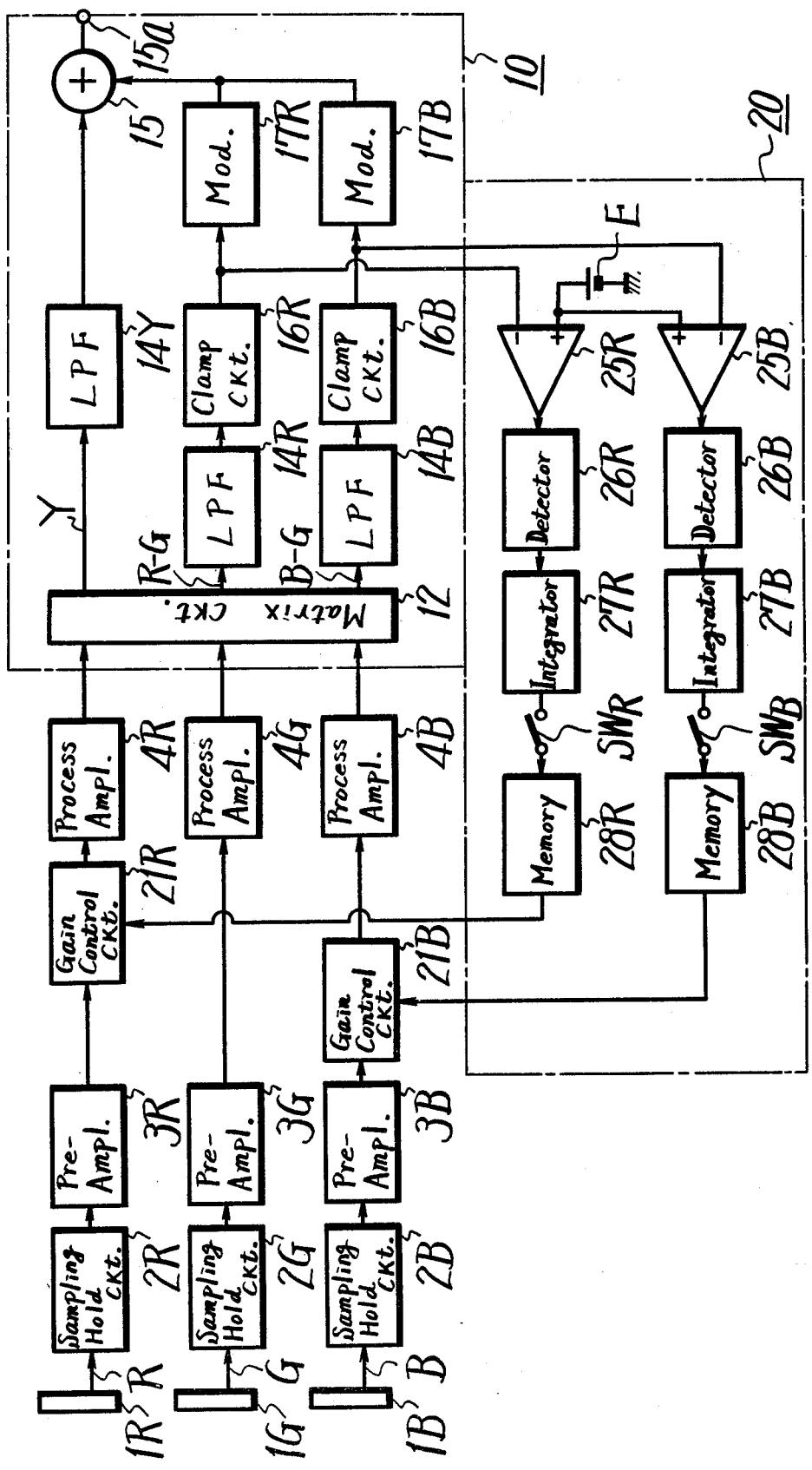
FIGS. 4 and 5 are respectively systematic block diagrams showing examples of the white balance control system according to the present invention.

In the example of the invention shown in FIG. 4, the color difference signals produced by a matrix circuit 12 are different from the well-known color difference signals. That is, the matrix circuit 12 is so formed that it produces mixed color signal components or primary color difference signals of R-G and B-G. The primary color difference signals R-G and B-G from the matrix circuit 12 are applied through low pass filters 14R, 14B and clamp circuits 16R, 16B to modulators 17R, 17B, respectively, similar to the prior art. In this case, however, the modulating axes are so selected such that one modulator 17R has the R-axis and the other modulator 17B has the B-axis, respectively. Thus, in the NTSC system, the signals are modulated with the phase and amplitude shown in the graph of FIG. 6.

In the example of the invention shown in FIG. 4, the primary color difference signals R-G and B-G delivered from the matrix circuit 12 are skillfully used to form a white balance control circuit 20 of simple circuit construction. In this invention, since the low pass filters 14R and 14B are used as filters which remove undesirable side band components and the clamp circuits 16R and 16B are used to reproduce the DC components of the outputs from the filters, the clamped outputs from the clamp circuits 16R and 16B being respectively used as the inputs to the white balance control circuit 20.

In the example of the invention shown in FIG. 4, the system, which compares the clamped outputs with the reference level, detects the compared outputs, integrates the detected outputs and controls the gain control circuits 21R, 21B by the integrated outputs, is the same as that of the prior art in circuit construction. Therefore, the description thereon will be omitted for the sake of simplicity.

As described above, according to the white balance control circuit of the invention, the white balance is controlled or adjusted in accordance with the clamped outputs from the clamp circuits 16R and 16B, so that the white balance control or adjustment can be performed in consideration of the signal transmission system including the elements from the process-amplifiers 4R, 4B to the clamp circuits 16R, 16B. Therefore, even if there are scattering and secular changes in the circuit elements up to the clamp circuits 16R and 16B, the white balance can be adjusted or controlled, including the scatterings and so on in these circuit elements. Thus, the balance is possible in the stage of the carrier chrominance signals. If the modulators 17R and 17B are made an integrated circuit, there is no scattering in either of them. Thus, the accuracy of the white balance control is improved a great deal.

Figure 1:
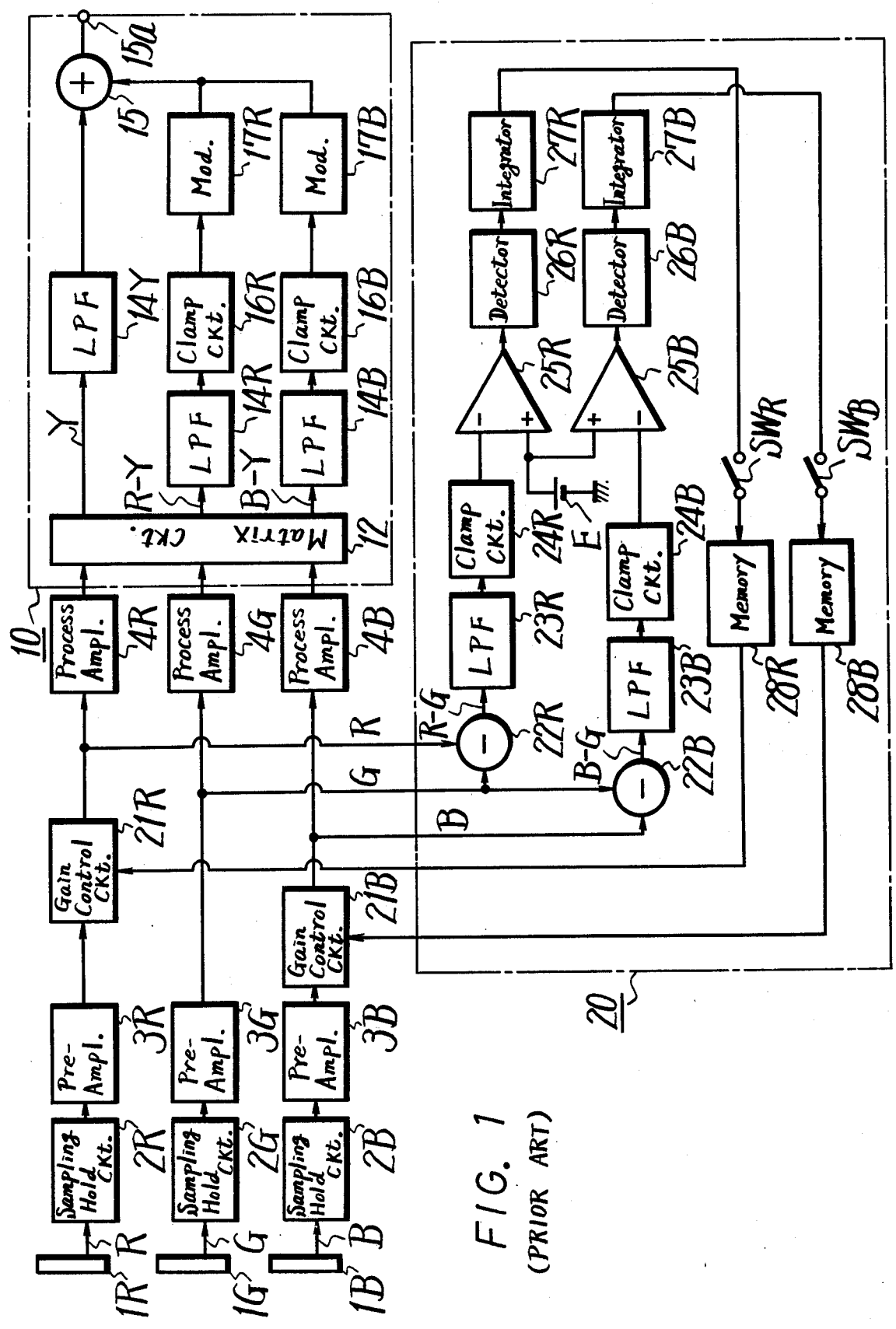
FIG. 1 is a systematic block diagram showing an example of the prior art.
Figure 2:
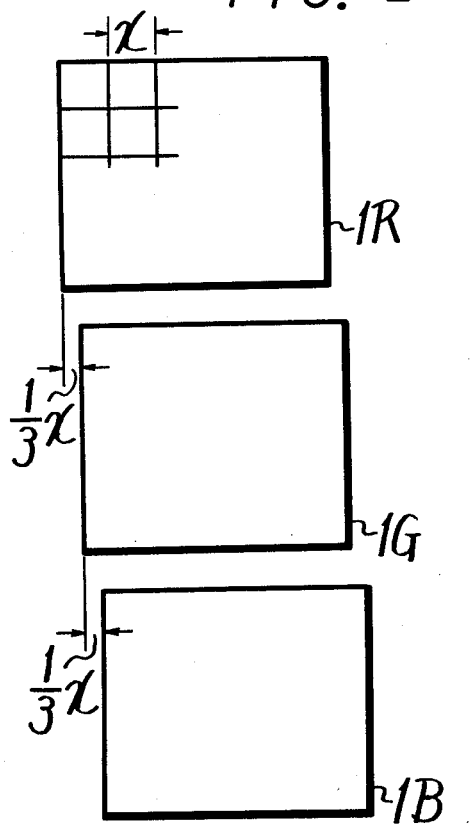
FIG. 2 is a diagram showing the arranging relation among the imaging elements used in the prior art shown in FIG. 1.

In the above example of the invention, since the outputs from the matrix circuit 12 are used as the primary color difference signals R-G and B-G, the subtracting circuits 22R and 22B used in the prior art example shown in FIG. 1 can be omitted, and in addition thereto the filters 14R, 14B and clamp circuits 16R, 16B provided in the encoder 10 can be used as the filters, which serve to remove the undesirable side band components of the primary color difference signals R-G and B-G, and the clamp circuits to reproduce the DC components, respectively. Therefore, the circuit construction of the invention is very simple.

Further, when a white board is used an object upon the white balance control, the detecting circuits 26R and 26B can be omitted. However, when a stepped pattern is used instead of the white board, there may occur such a case that, due to the fact that when the primary color signals R, G and B pass through the process-amplifiers 4R, 4G and 4B and the encoder 10, the influences on the primary color signals R, G and B by the signal transmission system are scattered, the primary color difference signals R-G and B-G between red and blue do not resemble each other.

Accordingly, in such a case, AC components are contained in the compared outputs, so that if the gain control circuits 21R and 21B are not controlled by the detected outputs from the detecting circuits 26R and 26B, the white balance cannot be controlled correctly. To this end, it is better for achieving the white balance control correctly that the detecting circuits 26R and 26B are provided as shown in FIG. 4 when the white balance control is achieved by using the stepped pattern.

Figure 5:
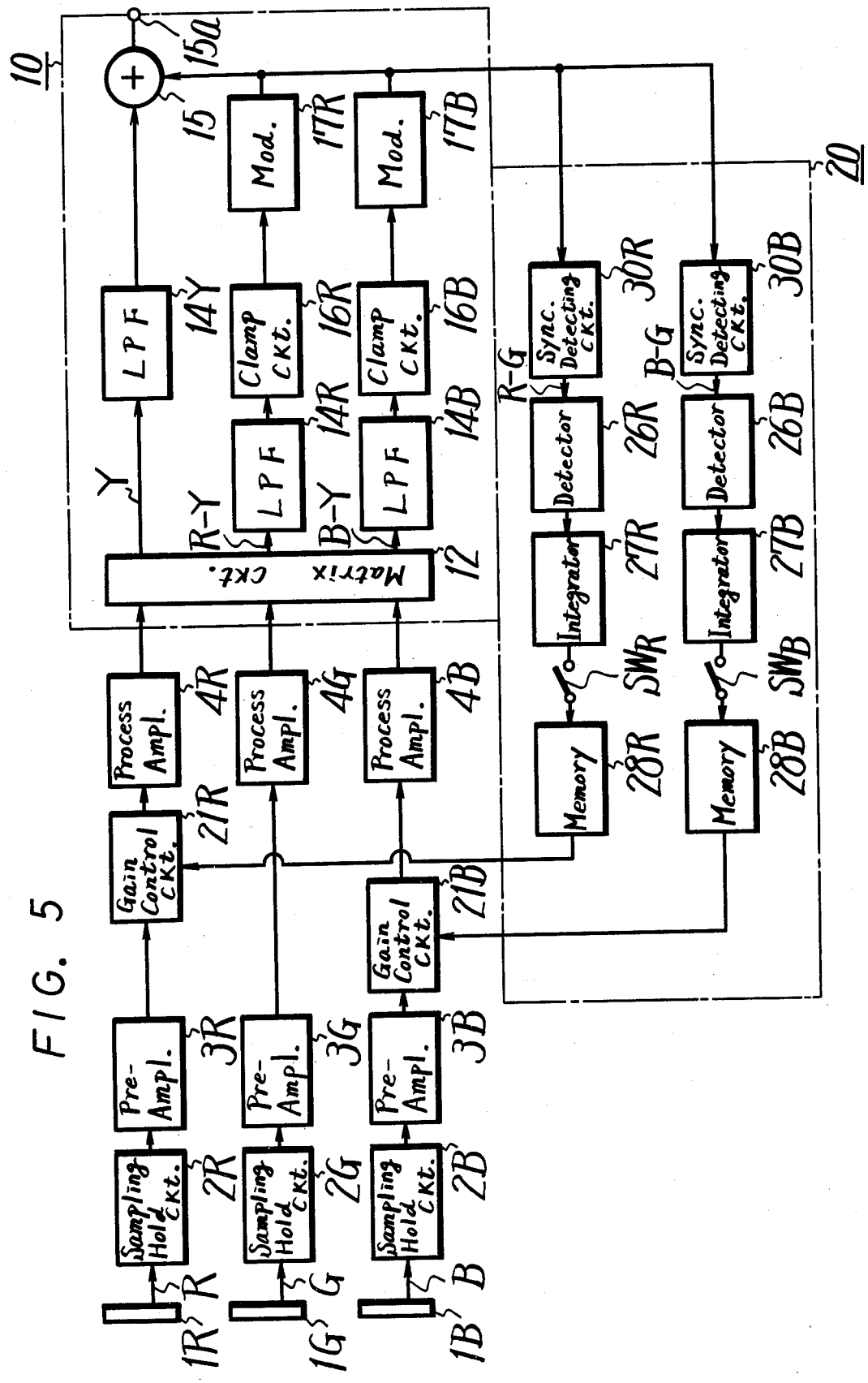

FIG. 5 is a systematic block diagram showing another example of the invention in which references the same as those used in FIG. 4 designate the same elements.

The example of FIG. 5 is the case where the ordinary encoder 10 is utilized. Thus, the carrier chrominance signals themselves are used as the input signals to the white balance control circuit 20. In order to obtain the signal components, or primary color difference signals R-G and B-G from the carrier chrominance signals, in the white balance control circuit 20, there are provided synchronous detecting circuits 30R and 30B which have the detecting axes R-G and B-G. That is, the output signals from modulators 17R and 17B are applied to the synchronous detecting circuits 30R and 30B, respectively. The synchronous detected output signals R-G and B-G therefrom are fed directly or without passing through the comparing circuits 25R and 25B used in the example of FIG. 4 to the detecting circuits 26R and 26B. The outputs therefrom are integrated by the integrating circuits 27R and 27B and then used as the gain control signals for the gain control circuits 21R and 21B through the memory circuits 28R and 28B, respectively, with the same effect as that of FIG. 4. The other circuit construction of FIG. 5 is substantially the same as that of FIG. 4.

It will be apparent to those skilled in the art that many variations and modifications may be made without departing from the spirit and scope of the novel concepts of the present invention.

We claim as our invention:

1. A white balance control system for an encoded composite color television signal comprising:
   (a) means for generating three primary color signals of green, blue and red;
   (b) matrix circuit means for converting said three primary color signals into a luminance signal and two mixed color signals;
   (c) means for deriving two primary color difference signals out of said two mixed color signals;
   (d) level detecting means for detecting the levels of said respective primary color difference signals;
   (e) feedback gain control means for controlling the levels of two of said three primary color signals supplied to said matrix circuit means in response to said detected outputs of said level detecting means;
   (f) modulating means for modulating sub-carriers with said mixed color signals for generating a chrominance signal; and
   (g) mixing means for mixing said luminance signal and said chrominance signal for generating the encoded composite color television signal.

2. A white balance control system as set forth in claim 1, wherein said two primary color difference signals are directly derived from said matrix circuit means, and said two primary color difference signals modulate said subcarriers at said modulating means.

3. A white balance control system as set forth in claim 2, wherein said two primary color difference signals are difference signals of said green signal and said blue signal, and said green signal and said red signal, respectively.

4. A white balance control system as set forth in claim 1, wherein said two mixed color signals are color difference signals of said blue signal and said luminance signal, and said red signal and said luminance signals, respectively.

5. A white balance control system as set forth in claim 4, wherein said two primary color difference signal deriving means includes synchronous detector means, and said chrominance signal from said modulating means is converted into said two primary color difference signals.

* * * * *